3,200,649
SEWER SAMPLING SYSTEM
Herbert T. Peterson, Longview, Wash., assignor to Weyerhaeuser Company, Tacoma, Wash., a corporation of Washington
Filed Dec. 21, 1962, Ser. No. 246,502
4 Claims. (Cl. 73—422)

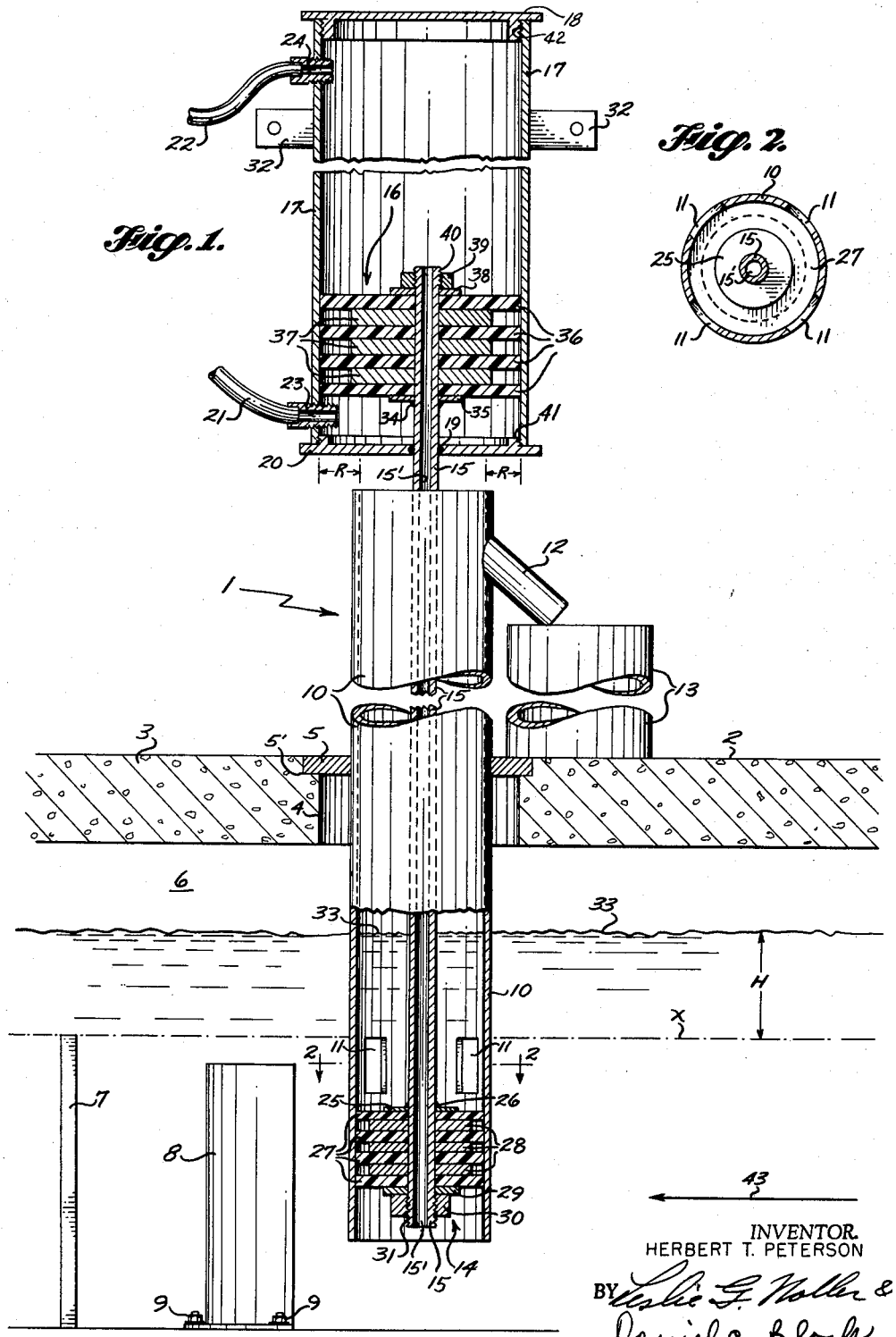

This invention relates to a method of and apparatus for taking sewer samples. Specifically, this invention relates to a method of and apparatus for obtaining a sample from an open sewer, containing solids, in direct proportion to the rate of flow in the sewer.

Heretofore, the prior art has suggested many types of samplers. These devices are designed to get a sample but do not function to give an indication of the rate of flow. The rate of flow must be determined by other means.

It is a principal object of this invention to provide a method of and apparatus for taking a sample in a sewer conduit which indicates the rate of flow in the sewer.

Another object is to provide a method of and apparatus for obtaining a sewer sample of a volume that is directly proportional to the rate of flow in the sewer.

These and other objects and advantages will become manifestly clear to those skilled in the art when taken in conjunction with the detailed description and figures wherein:

FIGURE 1 is an elevational view partly in section of the sewer sampler.

FIGURE 2 is a cross-sectional view taken on line 2—2 of FIGURE 1.

Referring to the drawings, the sewer sampler is generally indicated at 1. As disclosed, the sewer sampler 1 comprises a first cylindrical member or sample pipe 10 extending into the sewer conduit 6. The conduit 6 may be of any configuration but is usually rectangular in form. The first cylindrical member or sample pipe 10 extends through a manhole 4 and is supported therein by a grate 5. The grate 5 is supported in a notch 5' formed in the concrete subsurface 3 that is located below the surface of the earth 2.

A weir 7 of a predetermined height is affixed to the bottom surface of the conduit 6 downstream of the manhole 4 in any well-known manner. Also, immediately adjacent to but on the downstream side of the sample pipe or first cylindrical member 10 is mounted a curved baffle 8 properly supported to the bottom surface of the conduit 6 by bolts or other suitable means 9 to reduce the rate of flow of the liquid in conduit 6 adjacent the sample pipe 10.

Above the open lower end of the first cylindrical member or sample pipe 10, slots 11 are provided to afford communication between the interior and exterior of the sample pipe 10. As shown more clearly in FIGURE 2, there are four slots 11 through the sample pipe 10.

Positioned within the pipe 10 and below the slots 11 is a first piston member or plunger 14. The first piston member or plunger 14 is mounted on a piston rod 15 which extends to above the upper end of the sample pipe 10. The first piston member or plunger 14 comprises a washer member 25 properly welded to the piston rod 15 at 26. Spaced below the washer 25 is another washer 29. Between the washers 25 and 29 are provided a plurality of piston seals 27 and spacer members 28. The piston seals 27 and spacer members 28 are arranged such that there is a spacer member 28 between each piston seal 27. The piston seals 27, spacer members 28, and washer 29 are held on the piston rod 15 by a nut member 30 properly threaded onto the piston rod 15 by threads 31.

The piston rod 15 is provided with a longitudinal conduit 15' and extends from below the piston member 14 to above the upper end of the pipe 10 and into a second cylindrical member or air cylinder 17.

The second cylindrical member or air cylinder 17 is provided with a second piston member 16 mounted on the piston rod 15 below its upper end. The piston 16 is similar to the first piston member 14 and as shown is provided with a washer member 35 welded to the piston rod 15. Above the washer 35 are mounted a plurality of piston seals 36 and spacer member 37. The piston seals 36 and spacer members 37 are arranged such that the piston seals 36 are spaced apart from each other by a spacer member 37. Above the uppermost seal 36 another washer 38 is provided on the rod member 15 which is held down by a nut member 39 threaded onto the rod member 15 by threads 40.

The piston seals 36 in piston member 16 and the piston seals 27 in piston member 14 are formed of any suitable material such as rubber, rubber-like material or plastic material which functions to provide a seal between the piston members and the cylindrical members.

The second cylindrical member 17 is suitably supported by any support means, not shown, connected to the bracket members 32. The lower end of the cylindrical member 17 is closed by a closure member 20 screwed into the lower end of the cylindrical member by threads 41. The closure member 20 is provided with an opening having O-ring seals 19 therearound to provide a seal around the piston rod member 15. The upper end of the cylindrical member 17 is properly closed by a plate member 18 connected to the cylindrical member 17 by threads 42.

Immediately above the lower end of the cylindrical member 17, but below the piston member 16, an opening 23 is provided with a hose member 21 connected thereto. Immediately below the upper end of the cylindrical member 17 is provided another opening 24 with another hose or pipe 22 connected thereto.

The sewer sampling device 1 is designed to discharge a sample from the sample pipe 10 into a sample container 13 through the spout 12 in the following manner.

Let it be assumed that the sewerage in the conduit 6 is flowing in the direction of the arrow 43 and at a height indicated at 33.

The sewerage sampler 1 is inserted through the manhole 4 with the first cylindrical member or sample pipe 10 supported by grate 5.

The sampler 1 is inserted into the sewer conduit 6 a sufficient distance such that a horizontal plane designated at $x$ will extend through the top surface of slots 11 and the top surface of the weir 7.

Air is then pumped from a suitable source through conduit 22 and opening 24 into the upper end of the cylindrical member 17 above piston member 16. Since the lower end of the conduit 15' communicates with the upper end of the cylindrical member 17 above piston member 16, the air pressure will function to act on the liquid that tends to rise in the conduit 15' to the liquid level indicated at 33 and maintain the conduit 15' free of any liquids.

When it is desired to take a sample of the sewerage in the conduit 6 and measure the rate of flow thereof, air from a suitable source is pumped into the air cylinder 17 below the piston member 16 through the opening 23 and pipe or conduit 21. The air pressure below the piston member 16 is of such a magnitude that it will slowly raise the piston member 16, piston rod 15 and lower piston member 14. As the piston member 14 rises, the fluid above piston member 14, but below the top of the slots 11, will simply flow out the slots 11. When the piston member 14 reaches the top of the slots 11, the fluid trapped thereabove will be pushed up the sample pipe 10 by the piston member 14. The air pressure above piston member 16 will be communicated through the conduit 15' and below piston member 14 and be exhausted into the section of sample pipe 10 below piston 14. The air pressure above the piston member 16 then functions to maintain the liquid level of the sewerage within sample pipe 10 approximately adjacent the upper end of the slots 11. In this manner the liquid level will not rise up into the sample pipe 10 and interfere with the function of the lower piston member 14.

As the lower piston member 14 approaches the upper end of its stroke, it will deposite the sample thereabove into the container member 13 through the spout 12. When all of the sample is placed in the container 13, the air pressure below member 16 is simply relieved. This will cause the air pressure above piston member 16 to drive the piston member 16 downwardly to its lowermost position. This is brought about by reason of the fact that the radius of the upper piston member 16 is larger than the raduis of the lower piston member 14 by the increment R. Thus, the same pressure source will exert a greater total downward pressure on piston 16 than the upward pressure exerted on piston 14.

The sample in the sample member 13 is then taken by the operator and accurately measured for the volume thereof. Since the diameter or area of the sample pipe 10 is known and the volume of liquid in sample pipe 10 above the slots 11 is known by measuring the amount of liquid in the container 13, the height of the liquid above the slots 11 can be accurately determined by employing conventional engineering practices. After the height H has been accurately determined by the volumetric measurement in the container 13, the rate of flow over the weir 7 can now be accurately determined because the measured height H is the identical height of the water level above the top of the weir 7. With this height H known, the rate of flow of the liquids in conduit 6 can now be calculated using standard engineering practices.

The sample taken in container 13 can now be analyzed for purity and determination of solid matter present in the sewerage.

Accordingly, it is seen that the present invention provides an accurate measurement of the rate of flow in a sewerage system in addition to obtaining a sample for analysis in the treating system.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. An apparatus for obtaining a sample from a sewer conduit that indicates the rate of flow of liquids therein, the combination of: a weir mounted in the sewer of a predetermined height; a sample pipe having openings through the lower end thereof, the upper end of said openings adapted to be placed at an elevation corresponding to the upper end of said weir; and first piston means for trapping a fluid sample above said openings in said sample pipe; piston rod means connected to said piston means and extending upwardly through the sample pipe, a second piston means connected to the upper end of said piston rod, said piston rod provided with a conduit which communicates between the lower end of said first piston means and the upper end of said second piston means, said second piston means being mounted in an air cylinder spaced axially above said sample pipe, whereby said second piston means and piston rod connected thereto move said first piston means longitudinally in said sample tube to remove said fluid sample.

2. An apparatus for obtaining a sample from a sewer conduit in accordance with claim 1 wherein said second piston means is of a larger radius than said first piston means.

3. An apparatus for obtaining a sample from a sewer conduit, comprising: a sample pipe adapted to be extended into a conduit sewer and being provided with openings adjacent the lower end thereof, an air cylinder of a larger diameter than said sample pipe spaced axially above said sample pipe, a first piston means mounted in the sample pipe, a second piston means mounted in said air cylinder, said first and said second piston means being interconnected by a piston rod whereby said first and second piston means move longitudinally as a unit, said piston rod provided with a conduit extending between the upper end of said second piston means and the lower end of said first piston means.

4. An apparatus for obtaining a sample from a sewer conduit in accordance with claim 3 wherein the lower end of said air cylinder is provided with an opening which communicates with an air source, and said upper end of said air cylinder is provided with an opening connected to an air source whereby air may be injected into said air cylinder below said second piston means to drive said second piston means upwardly and raise said first piston means to remove said sample from said sample pipe and simultaneously therewith exhaust the air in the upper portion of said air cylinder above said second piston means through said conduit in said piston rod to below the first piston means.

References Cited by the Examiner

UNITED STATES PATENTS

| 75,939 | 3/68 | Love | 103—153 |
| 846,669 | 3/07 | Howell | 73—215 |
| 1,156,240 | 10/15 | McKay | 73—425.4 |
| 2,270,511 | 1/42 | Crain | 73—423 X |
| 2,598,535 | 5/52 | Green | 73—422 |

RICHARD C. QUEISSER, *Primary Examiner.*

JOSEPH P. STRIZAK, ROBERT L, EVANS,
*Examiners.*